United States Patent
Moessnang (10) Patent No.: US 9,856,042 B2
(45) Date of Patent: Jan. 2, 2018

(54) METHOD AND DEVICE FOR PACKAGING OF GOODS IN BAGS

(75) Inventor: Konrad Moessnang, Mindelaltheim (DE)

(73) Assignee: MULTIVAC SEPP HAGGENMUELLER SE & CO. KG (DE)

( * ) Notice: Subject to any disclaimer, the term of this patent is extended or adjusted under 35 U.S.C. 154(b) by 876 days.

(21) Appl. No.: 12/383,831

(22) Filed: Mar. 26, 2009

(65) Prior Publication Data

US 2009/0255218 A1  Oct. 15, 2009

(30) Foreign Application Priority Data

Mar. 26, 2008 (DE) .................. 10 2008 015 692

(51) Int. Cl.
| | |
|---|---|
| B65B 31/02 | (2006.01) |
| B65B 51/14 | (2006.01) |
| B65B 61/00 | (2006.01) |
| B29C 65/22 | (2006.01) |
| B29C 65/74 | (2006.01) |
| B29C 65/00 | (2006.01) |

(52) U.S. Cl.
CPC .......... B65B 31/024 (2013.01); B65B 51/146 (2013.01); B65B 61/005 (2013.01); *B29C 65/224* (2013.01); *B29C 65/7451* (2013.01); *B29C 66/00145* (2013.01); *B29C 66/1122* (2013.01); *B29C 66/43121* (2013.01); *B29C 66/8161* (2013.01); *B29C 66/8322* (2013.01); *B29C 66/849* (2013.01)

(58) Field of Classification Search
USPC ......... 53/428, 432, 436, 441, 79, 86, 89, 97, 53/103, 105, 434
See application file for complete search history.

(56) References Cited

U.S. PATENT DOCUMENTS

| | | | |
|---|---|---|---|
| 3,699,742 A | 10/1972 | Giraudi | |
| 3,958,391 A * | 5/1976 | Kujubu | 53/434 |
| 4,457,122 A * | 7/1984 | Atkins et al. | 53/434 |
| 4,545,177 A * | 10/1985 | Day | 53/434 |
| 4,550,548 A * | 11/1985 | Owensby et al. | 53/434 |

(Continued)

FOREIGN PATENT DOCUMENTS

| | | |
|---|---|---|
| DE | 25 52 342 | 5/1985 |
| DE | 31 51 463 | 6/1990 |

(Continued)

OTHER PUBLICATIONS

German Office Action dated Jun. 25, 2015, Application No. 10 2008 015 692.2, Applicant MULTIVAC Sepp Haggenmueller GmbH & Co. KG, 5 Pages.

*Primary Examiner* — Christopher Harmon
(74) *Attorney, Agent, or Firm* — Brooks Kushman P.C.

(57) ABSTRACT

A method and a device for packaging of products (28) in bags (26) comprises the steps of "forming a chamber (4) around the bag (26) by closing a lid (5)" and "evacuating the chamber (4)" or is formed such, respectively, in order to carry out these steps. It is the object of the device and the method, respectively, to enable an increase of the cycle performance of a packaging machine. Therefore, simultaneously with sealing the bag (26) by a sealing bar (11), the chamber (4) is vented and the bag (26) is clamped by at least a first clamping bar (10, 12).

22 Claims, 6 Drawing Sheets

(56) References Cited

U.S. PATENT DOCUMENTS

| | | | |
|---|---|---|---|
| 4,779,398 A * | 10/1988 | Glendon et al. | 53/434 |
| 4,922,686 A * | 5/1990 | Segota | 53/434 |
| 5,056,292 A | 10/1991 | Natterer | |
| 5,682,727 A | 11/1997 | Harte et al. | |
| 6,282,869 B1 * | 9/2001 | Bullock et al. | 53/434 |
| 6,862,867 B2 | 3/2005 | Cady et al. | |
| 7,726,104 B2 * | 6/2010 | Buchko et al. | 53/512 |
| 2004/0139701 A1 | 7/2004 | Cady et al. | |
| 2008/0022637 A1 * | 1/2008 | Buchko et al. | 53/527 |

FOREIGN PATENT DOCUMENTS

| | | |
|---|---|---|
| EP | 0 077 458 | 1/1986 |
| EP | 0 398 306 | 5/1990 |
| GB | 1 284 509 | 8/1972 |
| GB | 2 094 745 | 9/1982 |
| GB | 2 104 472 | 3/1983 |
| WO | WO-02/064429 | 8/2002 |

* cited by examiner

METHOD AND DEVICE FOR PACKAGING OF GOODS IN BAGS

The present invention relates to a method and a device for packaging of products in bags, in particular for a chamber belt machine.

The economy of machines is of high importance in an industrial environment. Therein in the field of packaging machines one of the most important factors is the packaging performance, i.e. the number of completely packaged products per unit time. The packaging performance also called cycle performance can only be increased in a restricted manner since the single process steps have to be executed successively and the time period thereof can be optimised only limitedly. For example a vacuum chamber of a packaging machine can be vented only after the package is sealed and the sealing seam is already cooled down because otherwise a tension would be applied to the sealing seam by venting the vacuum chamber which would damage or destroy the sealing seam.

From U.S. Pat. No. 6,862,867 B2 a device is known for packaging of products in bags, having a vacuum chamber, a sealing support device, a sealing rail and two cooling plates for cooling the region around the sealing seam.

It is the object of the present invention to provide a method and a device which make it possible to increase the cycle performance of the packaging machine.

This object is solved by a method according to claim 1 and a device according to claim 12. Further developments of the invention are indicated in the sub claims.

The tension acting onto the sealing seam during venting the evacuated chamber of the packaging machine is reduced to a minimum by clamping or airtight closing, respectively, of a bag already filled and evacuated and to be sealed, by means of a clamping bar during the sealing process. In this manner it is excluded that the sealing seam still being heated and therefore deformable is damaged or destroyed by an early venting of the chamber. Cooling of the sealing seam is favoured by the inflowing air into the chamber. The packing performance of the packaging machine can be increased by carrying out the process steps "sealing" and "venting" in parallel. As an alternative a smaller and less costly vacuum pump can be employed maintaining the cycle since for evacuating in the same cycle number more time is available for the process steps "sealing" and "venting" in parallel.

Further features and advantages of the invention follow from the description of embodiments referring to the enclosed drawings. From the Figures show.

Referring to FIGS. 1 to 4a) in the following a first embodiment of the present invention is described using an exemplary chamber belt machine. In the present embodiment the chamber belt machine is formed as an automatic chamber belt machine.

Figure 1:
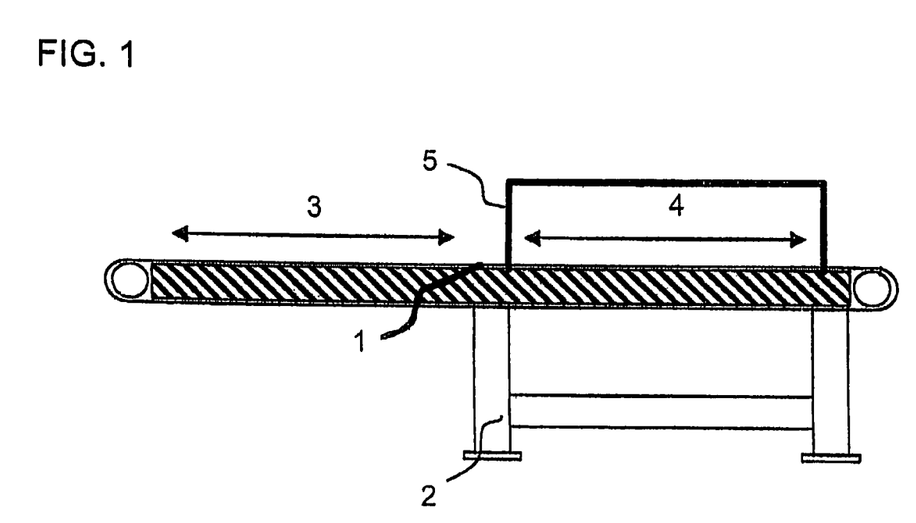
FIG. 1 a schematical view of a part of a chamber belt machine.

FIG. 1 shows a schematic view of a chamber belt machine having a conveyor belt 1, a rack 2, a placing region 3, a chamber 4 and a lid 5. The chamber 4 is formed by the lid 5 together with a lower portion 25 (see FIG. 2), wherein the lid 5 for example can be automatically opened driven by a motor or can be manually opened, in order to accommodate bags 25 to be evacuated or to be sealed, the bags being supplied automatically by the conveyor 1, and which closes thereafter automatically in order to form the chamber 4.

Figure 2:
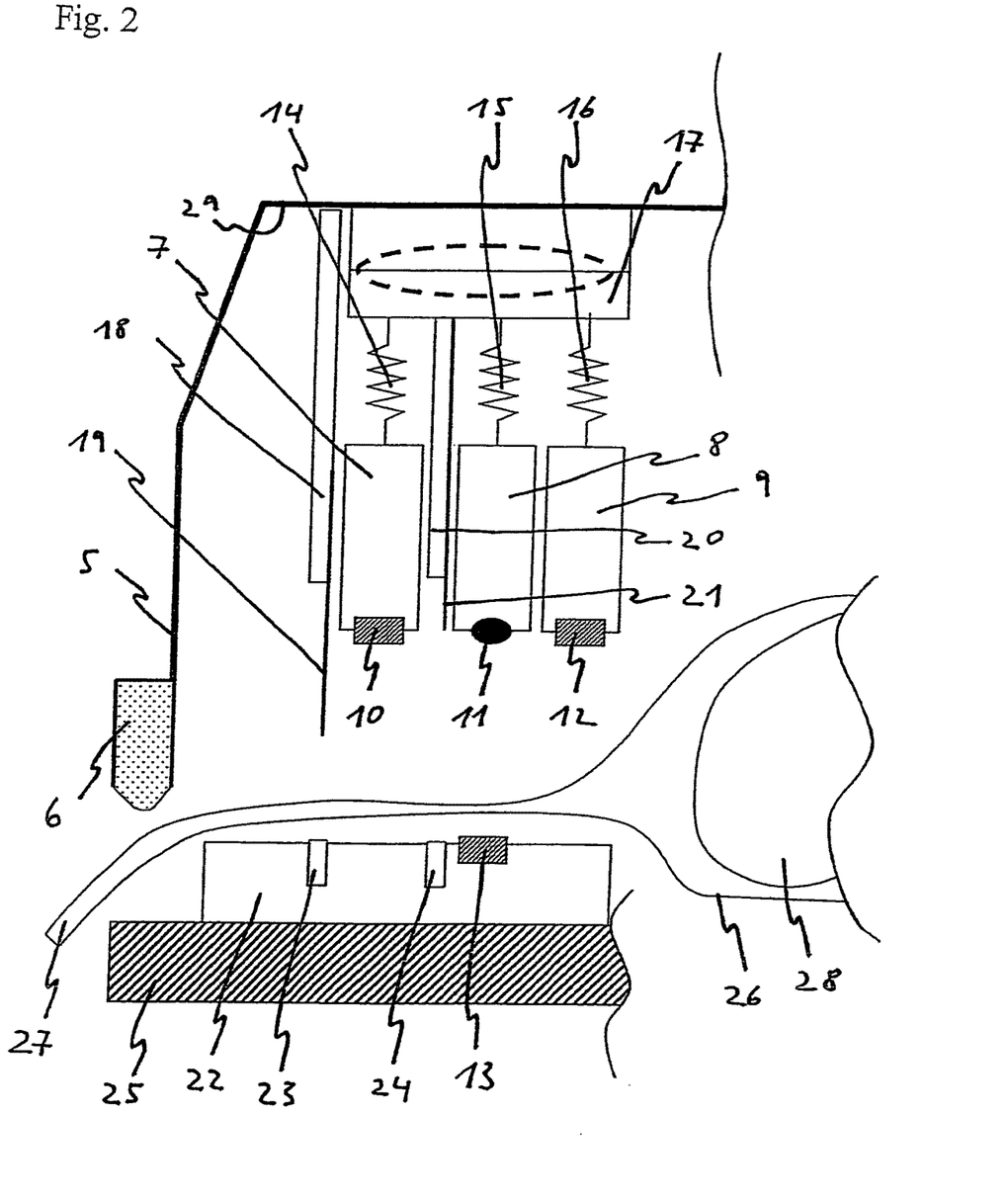
FIG. 2 a schematical sectional view of a part of a packaging machine in the region of a sealing bar.
Figure 3:
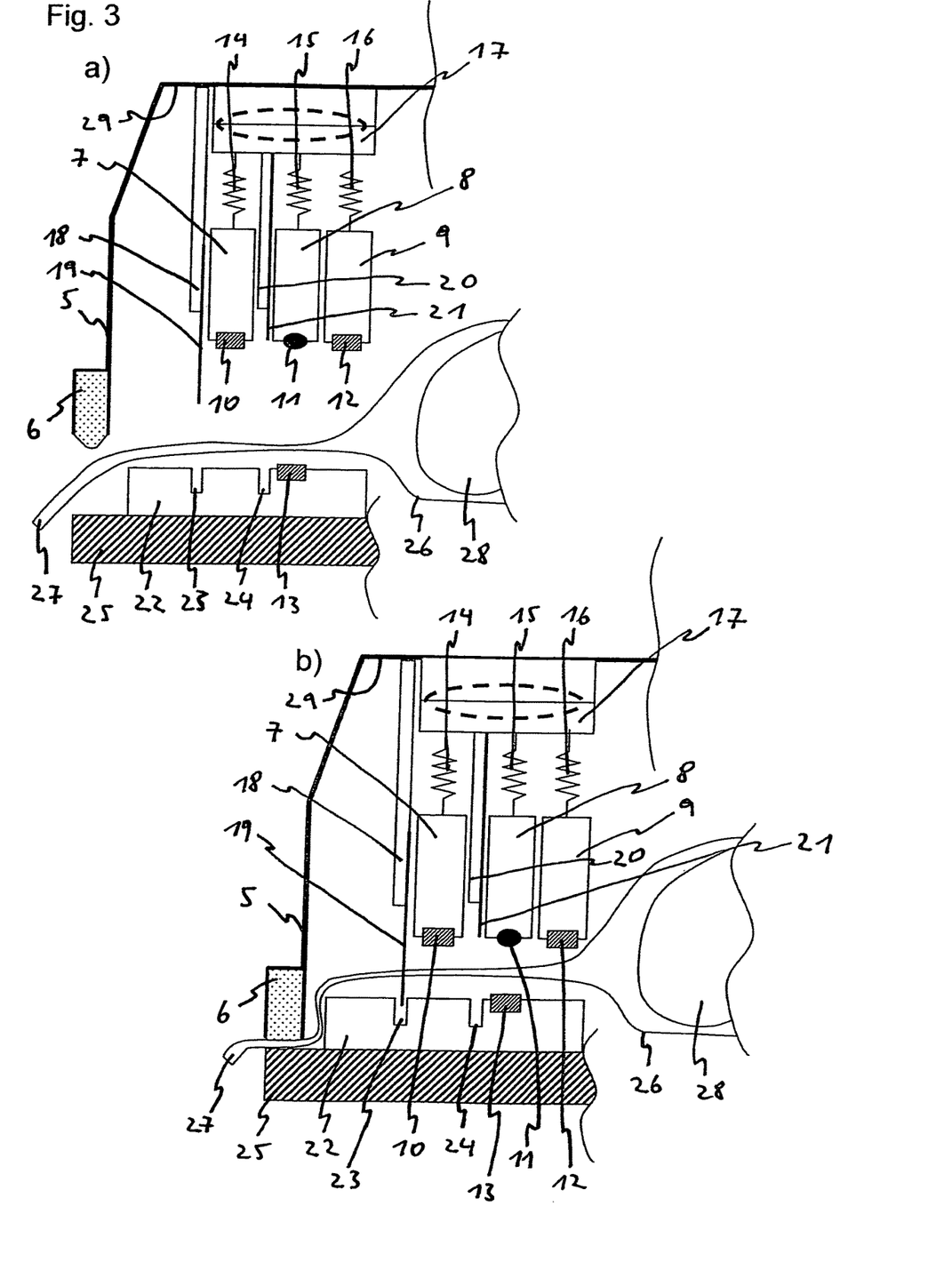
FIG. 3a) a schematical sectional view of a part of the packaging machine before closing the lid.
FIG. 3b) a schematical sectional view of a part of the packaging machine during slicing of the bag.
FIG. 3c) a schematical sectional view of a part of the packaging machine during evacuating of the chamber.
FIG. 3d) a schematical sectional view of a part of the packaging machine during cutting, sealing, venting of the chamber.
FIG. 3e) a schematical sectional view of a part of the packaging machine before opening the lid.
Figure 4:
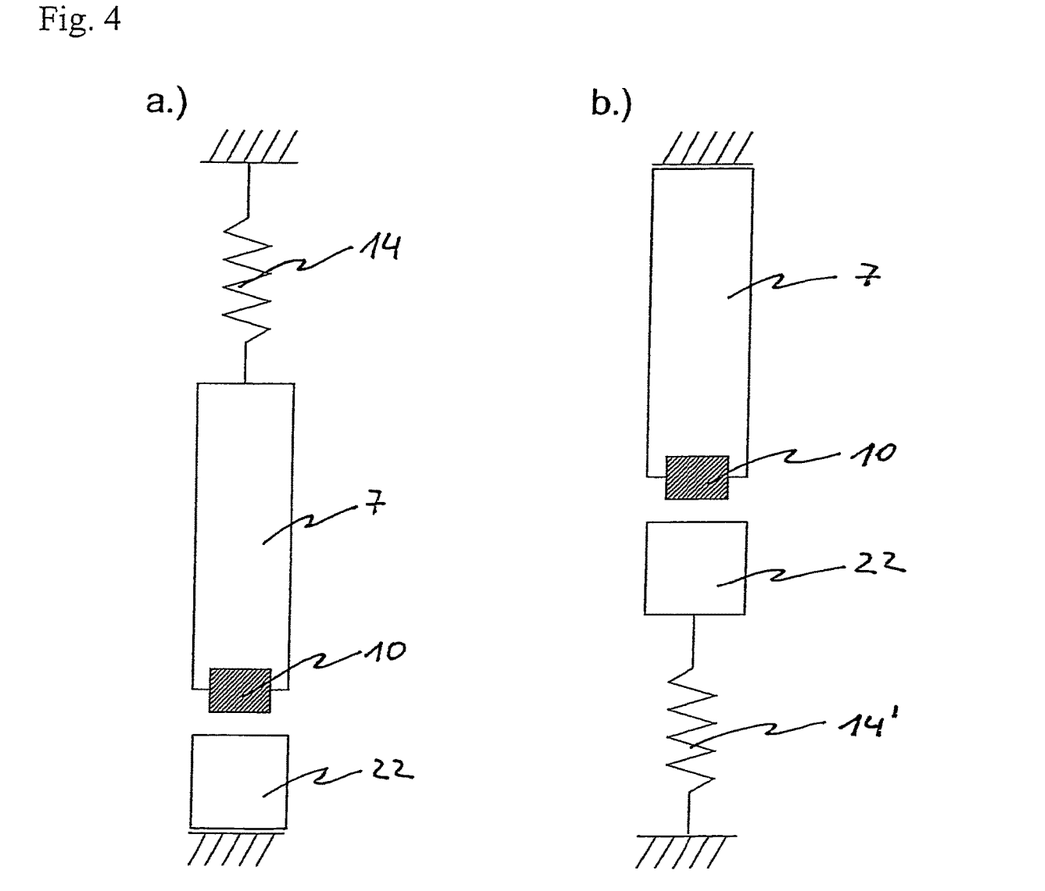
FIG. 4a) a schematical sectional view of a clamping bar in a first embodiment.
FIG. 4b) a schematical sectional view of a clamping bar in a second embodiment.

FIG. 2 shows a section of the chamber belt machine. The lid 5 is provided at its lower edge with a continuous lid gasket 6, in order to ensure that during lowering of the lid 5 the lid 5 or the lid gasket 6, respectively, forms the airtight chamber 5 during closing of the lid 5 together with the lower portion 25. At the inner side of a lid surface 29 of the lid 5 a receiving block 17 is provided. The receiving block 17 is lowerable relatively to the lid 5. At the lower side of the receiving block 17 first, second, third spring elements 14, 15, 16 are provided. A first clamping bar accommodation 7 is provided at the first spring element 14, a second sealing bar accommodation 8 is provided at the second spring element 15, and a second clamping bar 9 is provided at the first spring element 16. A first clamping bar 10 is provided at the lower side of the first clamping bar accommodation 7, a sealing bar 11 is provided at the lower side of the sealing bar accommodation 8, and a second clamping bar 12 is provided at the lower part of the second clamping bar accommodation 9. The first and second clamping bar accommodations 7, 9, the first and second clamping bars 10, 12 as well as the sealing bar accommodation 8 and the sealing bar 11 extend along the whole width of the bag into the plane of the drawing and out of it, respectively. During closing of the lid 5 the first clamping bar 10 and the second clamping bar 12 come into contact with an anvil accommodation 22. The sealing bar 11 comes into contact with a sealing bar anvil 13 which is embedded in the anvil accommodation 22. The anvil accommodation 22 is provided in the chamber 4 and extends together with the sealing bar anvil 13 along the whole width of the bag into the plane of the drawing and out of it.

At the lid 5 a first knife accommodation 18 is provided comprising a first knife 19. The first knife 19 is so long that it can cut or slice, respectively, the bag 26 already during closing of the lid 5. By slicing the bag 26 this can be evacuated and for example gassed or provided with product additives as brine or oil. The receiving block 17 comprises a second knife accommodation 20, at which a second knife 21 is provided. The knife accommodations 18, 20 and the knives 19, 21 extend along the full width of the bag into the plane of the drawing and out of it. The knives 19, 21 are not restricted to an integral form. Rather, a plurality of knives may be provided which may cut or slice, respectively, the bag 26. The second knife accommodation 20 and the second knife 21, respectively, is provided between the first clamping bar accommodation 7 and the sealing bar accommodation 8. The anvil accommodation 22 is provided with two knife slits 23, 24 into which the knives 19, 21 plunge for cutting.

In the chamber 4 there is provided a bag 26 wherein a product 28 is provided, and the bag neck 27 thereof extends in FIG. 2 to the left out of the chamber 4. The bag 26 is arranged such that the bag neck 27 is present essentially between the first and second clamping bar accommodations 7, 9 or the sealing bar accommodation 8 and the anvil accommodation 22, respectively.

In FIG. 3a) to e) the operation of the inventive device and the inventive method, respectively, are shown. The method comprises the following steps of:

As is shown in FIG. 3a) (see also FIG. 2) the filled and not yet sealed bag 26 is placed between the first and the second clamping bar accommodations 7, 9 and the sealing bar accommodation 8 and the anvil accommodation 22, respectively. The lid 5 is in the lifted position.

Thereafter, as is shown in FIG. 3b), the lid 5 is closed. The lid 5 together with the lower portion 25 forms the chamber 4. During lowering of the lid 5, the lid 5 is lowered together with the first knife accommodation 18 and the first knife 19, respectively, and slices the bag 26 in a region of the bag neck 27 distant from the product. The first knife 19 cooperates with the first knife slit 23.

As is shown in FIG. 3c), the chamber 4 is evacuated by means of at least a vacuum pump (dashed line). It is conceivable that instead of an integrated vacuum pump inside or at the machine, a central vacuum arrangement is provided.

As is shown in FIG. 3d), the receiving block 17 is lowered by a mechanical device relative to the lid 5. Together with the receiving block 17 the first clamping bar accommodation 7 and the first clamping bar 10, respectively, the sealing bar accommodation 8 and the sealing bar 11, respectively, and the second clamping bar accommodation 9 and the second clamping bar 12, respectively, are lowered. The bag 26 is fixed simultaneously by the two clamping bars 10, 12, is sealed by the sealing bar 11, and is cut by lowering the second knife accommodation 20 and the second knife 21, respectively, adjacent to the sealing seam. One or both clamping bars 10, 12 can also be formed such that they clamp the bag 26 and close it airtight. The second knife 21 cooperates with the second knife slit 24. At the same time the chamber 4 is vented (dashed line). In the evacuated state of the chamber 4, the bag foil essentially attaches to the product 28 whereby tension acts onto the still warm and deformable sealing seam. The tension forces are minimized by the two clamping bars 10, 12 which fix the bag 26. The sealing seam can cool down and favoured by the inflowing air and can cure without being damaged or destroyed, respectively. In this manner a gastight sealing of the bag 26 is secured. The pressure in the chamber 4 raises because of the inflowing air so that the bag foil completely attaches to the product 28.

As is shown in FIG. 3e), the receiving block 17 and the sealing bar 11 as well as the first and second clamping bars 10, 12 and the second knife 21 are returned to their original positions in FIG. 3a). The bag 26 and the cut-off bag neck 27, respectively, can be taken away. It is conceivable to lift the sealing bar 11, the two clamping bars 10, 12 and the second knife 21 simultaneously. It is also possible to lift the sealing bar 11 in this step firstly in order to strip off a possibly adhering bag foil by the permanent fixing of the two clamping bars 10, 12. Thereafter, the two clamping bars 10, 12 are lifted.

FIG. 4a) shows the first clamping bar accommodation 7 together with the first clamping bar 10 in a schematical sectional view. The first clamping bar accommodation 7 is provided with a first spring element 14, as was shown already in FIGS. 2, 3a) to e). In this manner, the first clamping bar 10 may adapt to possible unevennesses of the bag foil and possible tolerances in the anvil accommodation 22 so that a regular pressure may be built up. Therefore, an airtight sealing of the bag 16 with the clamping bars 10, 12 is secured. The second clamping bar accommodation 9 with the second clamping bar 12 and the sealing bar accommodation 8 with the sealing bar 11 are resiliently supported in the same manner. By this way of supporting by the sealing bar accommodation 8 a regular sealing pressure is secured over the whole width of the bag, which is an advantage for the quality of the sealing seam or the secure sealing, respectively.

FIG. 4b) shows a second embodiment of the manner of supporting the first clamping bar accommodation 7. The first clamping bar accommodation 7 together with the first clamping bar 10 is formed without spring means. However, the anvil accommodation 22 is provided with a spring element 14'. By this arrangement the effects already described above are obtained for the first and second clamping bars 10, 12 and the sealing bar 11.

The shape of the lid is not restricted to the shown shape. The lid can for example have the shape of a hollow sphere or another arbitrary shape. The arrangement of the clamping bars and the sealing bar, respectively, are not restricted to the shown shape. For example only one clamping bar accommodation together with one clamping bar may be provided which is arranged adjacent to the sealing bar accommodation and the sealing bar, respectively.

Furthermore, it is conceivable to treat a plurality of bags at the same time in the chamber. Furthermore, it is conceivable to provide only one knife accommodation together with one knife. In particular, the first knife 19 can be omitted. The bag must not necessarily be sliced by a knife, rather openings may be formed in the bag in another manner, for example by stamping.

Furthermore, it is conceivable to support the sealing bar accommodation and the clamping bar accommodation without resiliency. The precisions of the bars must be correspondingly high.

The spring suspension described by means of the spring elements is not restricted to springs. Rather it is conceivable to employ elastical plastic element or the like.

Furthermore, the invention is not restricted to the employment in a chamber belt machine. It is also applicable to a chamber machine without conveyor belt.

The invention claimed is:

1. A method for packaging a product in a bag, the method comprising:
    forming a chamber around the bag by closing a lid;
    cutting a neck of the bag with a first cutting member during closing of the lid to enable the bag to be evacuated, wherein cutting the neck of the bag with the first cutting member is performed such that the first cutting member cuts through two layers of the bag;
    evacuating the chamber;
    simultaneously sealing the bag by a sealing bar and venting the chamber; and
    cutting the bag with a second cutting member, simultaneously with the sealing and venting, to remove the neck of the bag, wherein the second cutting member is positioned between the first cutting member and the sealing bar when the lid is closed.

2. The method according to claim 1 wherein cutting the neck of the bag with the first cutting member comprises forming multiple openings in the bag.

3. The method according to claim 1 further comprising clamping the bag by a first clamping bar during the sealing and venting, wherein cutting the neck of the bag with the first cutting member is performed before the clamping, and the evacuating is initiated before the clamping.

4. The method of claim 1 wherein closing the lid is performed such that the lid is closed against a conveyor belt.

5. The method of claim 1 wherein cutting the neck of the bag with the first cutting member is performed such that the first cutting member cuts the bag partially along a width of the bag, and wherein sealing the bag is performed such that a sealing seam is formed along the width of the bag.

6. The method of claim 1 wherein closing the lid is performed such that the lid is closed against an end of the bag.

7. The method of claim 1 further comprising clamping the bag by a first clamping bar and a second clamping bar, wherein the sealing bar is arranged between the first clamping bar and the second clamping bar when the lid is closed.

8. The method of claim 7 wherein the cutting with the first cutting member is performed before the clamping.

9. The method according to claim 7 further comprising closing the bag airtightly with the first and/or second clamping bars.

10. The method according to claim 7 further comprising resiliently supporting the first clamping bar, the second clamping bar, and/or the sealing bar and/or corresponding anvils.

11. The method according to claim 7 further comprising rigidly supporting the first clamping bar, the second clamping bar, and/or the sealing bar and/or corresponding anvils.

12. The method according to claim 7 further comprising lowering and/or raising the sealing bar and the first clamping bar and/or the second clamping bar commonly.

13. The method according to claim 7 further comprising lifting the sealing bar before the first clamping bar and/or the second clamping bar.

14. The method of claim 7 wherein the first cutting member, the clamping bars and the sealing bar are attached to the lid.

15. A device for packaging a product in a bag, the device comprising:
a movable lid;
a lower portion, which together with the lid forms a chamber when the lid is closed against the lower portion;
a sealing bar for sealing the bag inside the chamber;
first and second clamping bars for clamping the bag during sealing;
a first cutting member attached to the lid for cutting a neck of the bag, wherein the first cutting member is able to be raised and lowered with the lid and is configured to cut the neck of the bag during closure of the lid against the lower portion so that the bag may be evacuated; and
a second cutting member for cutting the bag to remove the neck of the bag, wherein the second cutting member is positioned between the sealing bar and the first cutting member when the lid is closed;
wherein the sealing bar and the second cutting member are positioned between the clamping bars when the lid is closed wherein at least one of the clamping bars is configured to close the bag airtightly, and wherein the device is operable to simultaneously seal the bag with the sealing bar, vent the chamber and cut the bag with the second cutting member to remove the neck of the bag.

16. The device of claim 15 wherein the lid is configured to close against an end of the bag when the lid and the lower portion form the chamber.

17. The device of claim 15 wherein the clamping bars are configured to clamp the bag after the first cutting member has cut the bag.

18. The device according to claim 17 wherein the second cutting member can be lowered and raised together with the first clamping bar and/or the second clamping bar.

19. The device according to claim 18, wherein the second cutting member is movably connected to the lid such that the second cutting member can be lowered and raised together with the lid, as well as moved with respect to the lid.

20. The device of claim 17 further comprising a block movably attached to the lid, wherein the clamping bars and the sealing bar are each attached to the block such that the clamping bars and the sealing bar are movable with the block and with respect to the lid.

21. The device of claim 20 wherein the sealing bar is configured to form a sealing seam on the bag, and the second cutting member is configured to cut the bag in a direction parallel to the sealing seam.

22. The device of claim 15 wherein the first cutting member is configured to cut through two layers of the bag.

* * * * *